July 7, 1953 H. G. HUEBSCH 2,644,409
APPARATUS FOR REMOVING FROZEN CONFECTIONS FROM SPURS
Filed March 27, 1948 3 Sheets-Sheet 1
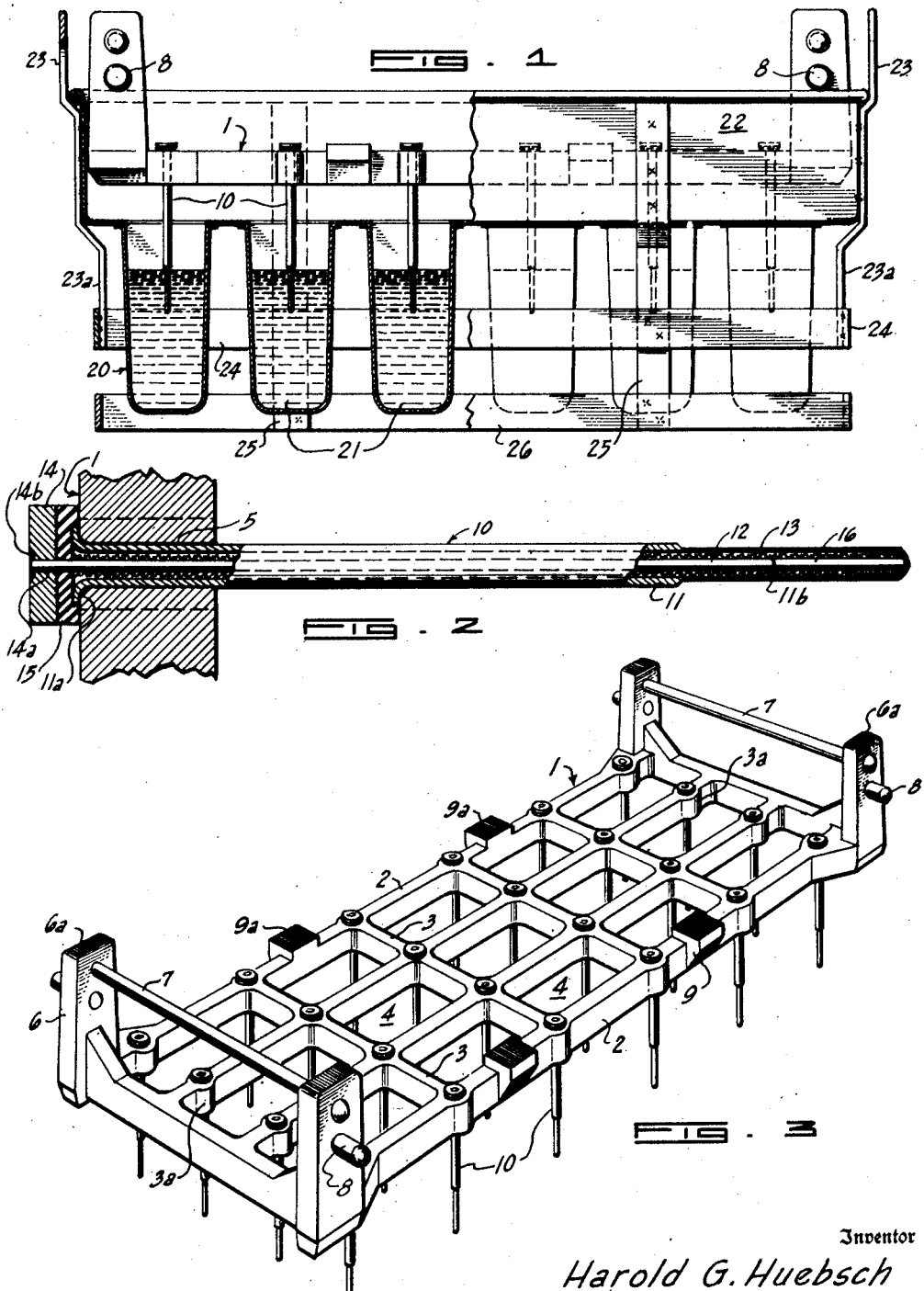
Inventor
Harold G. Huebsch
Attorney

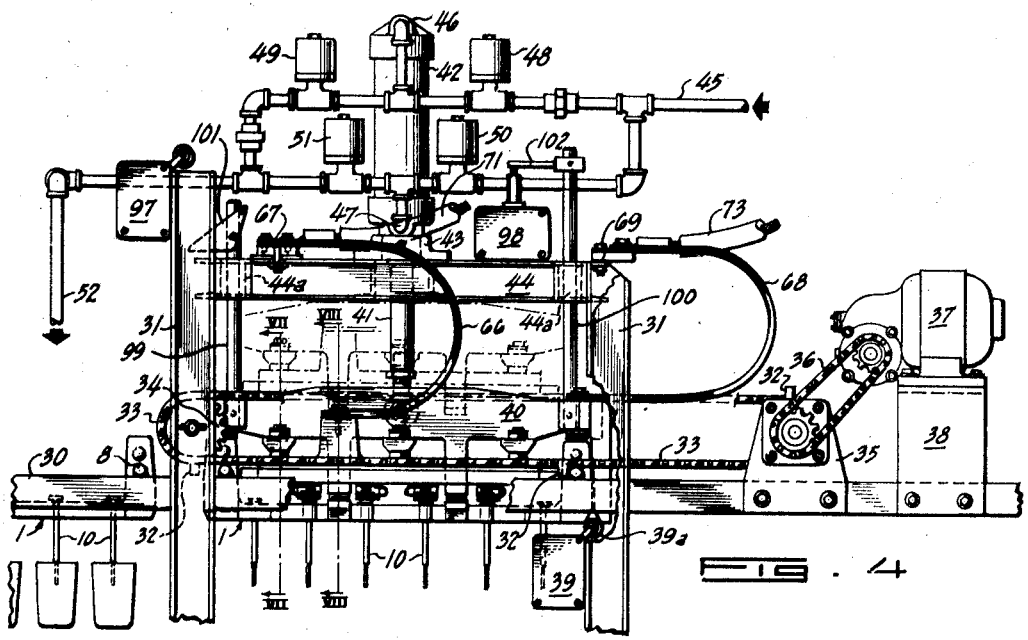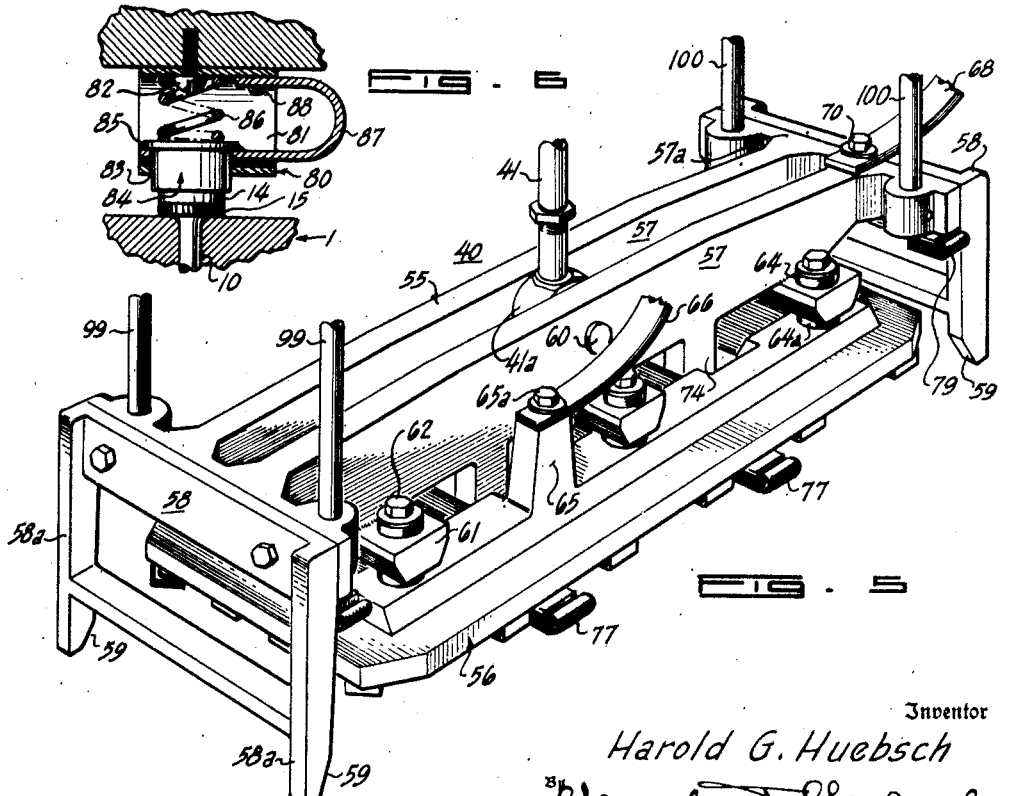

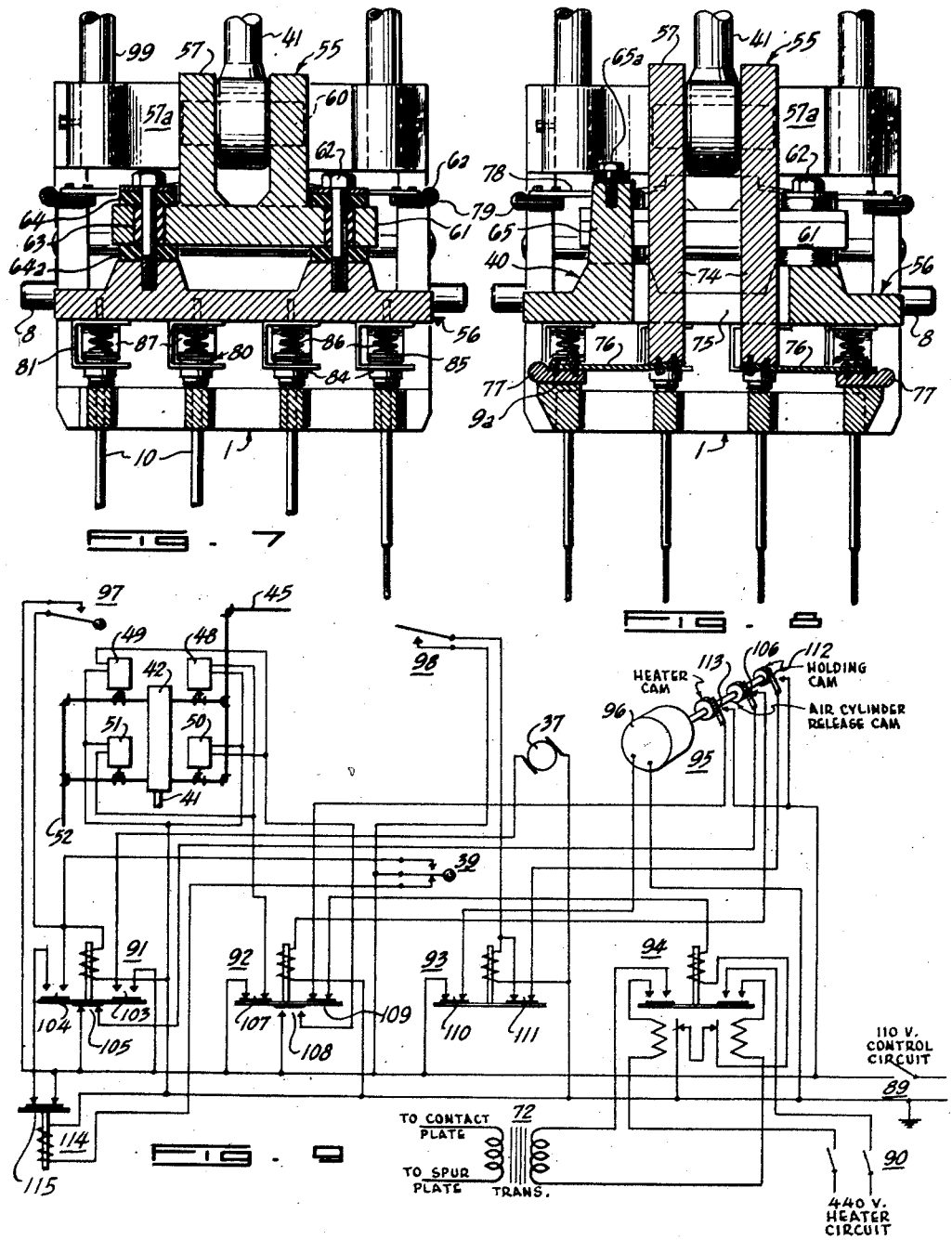

Patented July 7, 1953

2,644,409

UNITED STATES PATENT OFFICE 2,644,409

APPARATUS FOR REMOVING FROZEN CONFECTIONS FROM SPURS

Harold George Huebsch, San Diego, Calif.

Application March 27, 1948, Serial No. 17,448

16 Claims. (Cl. 107—8)

The present invention relates generally to means for supporting frozen confections during the steps of their manufacture, and in particular to a means for facilitating and automatically controlling the removal of the confections from the supporting means for subsequent handling and packaging operations.

Frozen confections of the type comprehended by this invention are usually formed in multi-cavity molds of the appropriate size and shape on series of elongated spurs which are depended into the central portion of each mold from a spur plate. After the freezing operation, the molds are then subjected to a sufficiently elevated temperature, as by immersion in hot water, to loosen and remove the frozen confections from the molds, and the spur plate with the frozen confections depending therefrom is then used to support the articles during subsequent chilling or dipping operations without contacting each other and eliminating the necessity for manual handling. Thereafter, it becomes necessary to remove the frozen articles from the spurs for packaging, and the primary objective of the present invention is to provide an apparatus for so doing whereby the operation is facilitated and automatically controlled, and by which the quality and perfection of the finished articles are improved.

It is old in the art to conduct heat to spurs of this type by various means for the purpose of partially melting the confection at the contact surface with the spur and causing removal therefrom by gravity, as per example, by the use of an electrical resistance disposed within the spur. We have found, however, that spur constructions as taught by this patent or any other of which we are aware are disadvantageous in that they require an inordinate time interval to effect separation of the frozen confection from the spur, are complicated in themselves and with respect to the necessary supporting structure as well as to the equipment required for the conductance and control of electrical current to them, and by their nature require such excessive energy in order to cause separation that sufficient residual heat remains in the spur after the frozen article is "doffed" or separated to cause burning or carmelization of residual matter left on the spur which in turn contaminates or affects the flavor of the next article in which the spur is used.

The present invention contemplates a spur construction for the purpose described in which the frozen confections are separated from the spur by utilizing the contact surface of the spur itself as an electrical resistance, and impressing a low-voltage controlled current therein to effect separation of the article in a minimum of time and without danger of elevating the temperature of the spur sufficiently to cause carmelization of residual matter remaining on the spur after separation.

A further object of the invention is to provide an electrically heated spur for the described purpose particularly adapted by its simplicity of construction to economical manufacture and ease of maintenance or replacement.

Still another object of the invention is to provide apparatus for the support of a plurality of electrically heated spurs for the purpose described whereby a low-voltage electrical current may be simultaneously impressed upon each spur to effect an accurately controlled amount of heat to be developed in the contact surfaces of each, and thus to minimize the time necessary to cause separation of the supported articles from the spurs.

A still further object of the invention is to provide apparatus for automatically controlling the current impressed upon a plurality of parallel connected spurs of the type adapted to be electrically heated in response to movement of their supporting structure or spur plate, to the end of effecting uniformity of operation.

Further objects and advantages of the invention reside in the detailed construction of the apparatus and result in simplicity of manufacture, maintenance, and operation, and particular suitability to the handling of frozen confections under the described process. These objects and advantages will be apparent from the following description wherein a preferred form of embodiment is shown, reference being had to the accompanying drawings which form a part hereof and in which like numerals of reference denote similar elements in the specification.

In the drawings:

Figure 1 illustrates a preferred form of mold and spur plate embodying the features of this invention;

Figure 2 is a partial section showing the construction of the spur embodied in this invention;

Figure 3 is a perspective of the spur plate;

Figure 4 is a side elevation of the apparatus for automatically effecting and controlling the separation of the frozen articles from the supporting spurs;

Figure 5 is a perspective view of the contact carrier utilized in the invention;

Figure 6 is a detail of one of the contacts provided between the contact carrier and one of the spurs;

Figure 7 is a section on line VII—VII of Figure 4;

Figure 8 is a section on line VIII—VIII of Figure 4;

Figure 9 is a schematic diagram illustrating the means for automatically controlling the operation of the apparatus for separating the frozen articles from the spurs.

Figure 1 illustrates a spur plate 1 is comprehended by the present invention, adapted to support a plurality of spurs 10 centrally within the cavities 21 of a conventional mold 20. The cavities 21 may be of any convenient size and number, and are formed in the bottom sheet of a sheet metal pan 22 serving as receptacles for the unfrozen material and to shape and form it during the freezing operation. The mold 20 is provided at each end with a sheet metal bale 23 serving as a handle, and in the form illustrated, downward extensions 23a or the bales 23 support by welding or riveting an upper guard member 24 surrounding the cavities 21 to prevent accidental damage thereto. A pair of vertical support strips 25 are fastened to each side of the pan 22 and to the upper guard 24, and are attached at their lower extremities to a lower guard member 26 separated from the cavities 21 and surrounding them as additional protection against damage and serving as a support when the mold is placed upon a flat surface.

The spur plate 1, as best shown in Figure 3 is adapted to fit within the pan 22 of the mold 20 and to be so supported that each of the spurs 10 depend a predetermined distance within the center of each of the cavities 21. To promote lightness the spur plate 1 is preferably formed as a unitary casting comprising a series of longitudinal portions 2 and a series of intersecting transverse portions 3 having relief holes 4 cored out between them. The portions 2 and 3 and a series of enlarged bosses 3a at each end are so spaced that their intersections coincide with the centerlines of the cavities 21 of the mold 20, and each intersection is provided with a hole 5 (Figure 2) accommodating a spur 10 as a press fit.

Vertical projections 6 are integrally cast at each outer corner of the spur plate 10 and are provided with flat top surfaces 6a. Transverse rods 7 are fitted between holes therein as handles. Each of the vertical projections 6 is provided with an outwardly disposed stud 8 adapted to contact the upper edge of the pan 22 of the mold 20 when the spur plate 1 is assembled therein, and position the spur plate 1 in the mold 20 to determine the relative height of the spurs 10 within the cavities 21. A pair of contact bosses 9 is integrally cast on each of the outer longitudinal portions 2, having flat upper faces 9a raised above the general upper plane of the longitudinal and transverse sections 2 and 3.

The construction of the spur member 10 is a particularly important feature of the present invention and forms a basis for the apparatus described herein. As shown in Figure 2 the spur 10 consists essentially of a stainless steel outer tubular housing 11, an axial copper conductor 12, a concentric fibreglass insulating sleeve 13, a conducting head washer 14, and an insulating bushing 15. The upper end 11a of the tubular housing 11 is flared outwardly to serve as a positioning flange for the spur 10 when assembled in the spur plate 1. The lower extremity 11b of the tubular housing 11 is reduced in diameter and wall thickness by turning or grinding for a distance from the lower tip of the assembly equal to the distance to which the spur is immersed in the material of the confection in the cavity 21. The upper end of the conductor 12 is disposed through a hole 14a in the conducting head portion 14 and is spot welded or brazed thereto as at 14b. The head portion 14 is electrically insulated from the flange 11a by the insulating bushing 15, the conductor 12 passing through a central hole therein, and being separated from contact with the tubular housing 11 by the insulating sleeve 13. To facilitate manufacture, a short length of stainless steel rod 16 of the same diameter as the copper conductor 12 is brazed or soldered to the lower end thereof before insertion within the tubular housing 11 and the insulating sleeve 13. After assembly, the stainless steel rod 16 is then cut off at the lower end of the housing 11, and the two elements are then welded together and ground to form a homogeneous and smooth connection, which also serves to hold all of the elements of the spur in assembled relation.

From the foregoing description, it will be apparent that the spur comprehended by this invention is essentially an electrical resistance element. The elements comprising the conducting circuit of the spur are so proportioned and selected that when a suitable electrical current is impressed across the circuit comprising the head washer 14, the central conductor 12, and the tubular housing 11 to the spur plate 1, the resistance of the reduced end portion 11b creates an increased temperature over its length while the remainder of the elements remain relatively cool. Thus only the portion of the spur in active contact with the frozen mixture, i. e., the reduced tip 11b, is heated sufficiently to melt the mixture, the remaining elements of the spur serving primarily as conductors. Since the heat for melting the frozen mixture to separate the frozen article from the spur 10 is generated within the reduced tip 11b by its own resistance, in distinction to other constructions wherein the heat is transferred to the surface contacting the frozen mixture by conduction or radiation, the amount of heat necessary to cause the "doffing" action may be accurately developed by controlling the amount of electrical energy impressed on each spur. For this same reason and the small heat capacity of the tip, there is no appreciable time lag in reducing the temperature of the reduced tip 11b after the actuating current is interrupted, and therefore residual heat may be minimized and "carmelization" of any of the frozen mixture that may be left on the spur after separation is avoided.

It will be noted from the foregoing description of the spur 10, that its construction and arrangement is especially simple and compact leading to low cost of manufacture and ease of maintenance. Additionally, the elimination of resistances or other heating elements from the core of the spur housing, minimizes the required diameter of the spur and therefore the indentations in the frozen articles, thus improving the appearance of the finished products.

Figure 4 generally illustrates the apparatus comprehended by this invention for simultaneously impressing a low-voltage electric current in parallel arrangement on the spurs carried by the spur plate 1 for the purpose of heating them to separate the frozen articles therefrom after the freezing, mold separating, and dipping operations have been completed.

The apparatus is characterized as comprising a contact carrier consisting of two contact plates electrically insulated from each other and connected to the terminals of a source of low-voltage electrical power, adapted to be moved into or out of contacting engagement with the elements of a spur plate by means of a pneumatic actuating cylinder, and means for automatically controlling the electric current directed through the contact plates to the spurs, for the purpose of heating the spurs to separate the frozen articles attached thereto.

With particular reference to Figure 4, the spur plate 1 supporting a frozen article on each spur is moved into operation with the separating apparatus on a pair of spaced horizontal tracks 30 which support the spur plate 1 by means of the studs 8 projecting from the corners of each assembly. The tracks 30 are fastened to and supported by vertical frame members 31. As the loaded spur plates are moved progressively into the separating apparatus (from left to right as represented in Figure 4), the forward studs 8 of the spur plate are engaged by lug-bearing links 32 of a motor-driven chain 33 and the spur plate is drawn toward the right on the tracks 30 into position under the vertically movable contact carrier 40.

The chain 33 extends around a sprocket 34 journalled in the lefthand vertical frame members 31 and around a second sprocket journalled in a bracket 35 supported by the tracks 30, which is in turn driven through a chain and sprocket drive 36 by a speed reducer and electric motor 37 which is supported from the tracks 30 by a mounting bracket 38.

Counterclockwise movement of the chain 33, driven by the motor 37, causes the lug-bearing links 32 to engage the forward studs 8 of the spur plate 1 and moves it towards the right until the forward lower corner of the spur plate 1 actuates a switch 39 by contact with and movement of a roller-bearing operating arm 39ª to break the power circuit to the motor 37, thus interrupting further movement of the spur plate and locating it beneath the contact carrier 40.

The contact carrier 40 is suspended on the distal end of a piston rod 41 of a pneumatic actuating cylinder 42. The pneumatic cylinder 42 is vertically supported by means of a bearing member 43, in turn mounted on a horizontally disposed structural frame 44 bolted or otherwise fastened to the vertical members 31, additionally serving to provide a rigid frame for supporting the entire apparatus.

The pneumatic actuating cylinder 42 is adapted to raise and lower the contact carrier 40 in response to pneumatic pressure directed through the supply line 45 either to the upper or lower side of its piston through the entry ports 46 and 47 respectively under control of the electromagnetically controlled valves 48, 49, 50, and 51. When the valves 48 and 51 are opened, with valves 49 and 50 closed, pressure from the supply line 45 extends the piston rod 41 to lower the contact carrier 40 venting the lower side of the cylinder 42 to the exhaust line 52. When the valves 50 and 49 are opened with valves 48 and 51 in closed position, the piston rod 41 is retracted to raise the contact carrier 40 by directing pressure to the lower side of the pneumatic actuating cylinder 42 and venting the upper end to the exhaust line 52.

The contact carrier 40 (Figure 5) consists essentially of an upper contact plate 55 bolted to, but dielectrically separated from a lower contact plate 56. The upper frame member 55 is preferably a casting formed generally as a pair of longitudinal webs 57 terminating in intgeral transversely disposed end portions 57ª. Pairs of guide rods 99 and 100 are pinned or otherwise fastened to bosses provided on each outward end of the end portions 57ª and are adapted to slidably engage bearing members 44ª supported in the horizontal frame 44 to guide and position the contact carrier 40 during vertical movement. To each end of the contact plate 55 is bolted or otherwise fastened a guide frame 58 having downwardly directed leg portions 58ª which are provided with inclined surfaces 59 and are spaced apart in such a manner as to slide over the vertical projections 6 of the spur plate 1 and laterally position the contact carrier 40 with respect thereto.

The distal end of the piston rod 41 is provided with a bearing 41ª which serves as a journal for a pin 60 disposed in suitable holes through the webs 57 and provides a connection between the contact carrier 40 and the pneumatic cylinder 42.

A plurality of transverse portions 61 are integrally cast across the lower faces of the longitudinal webs 57 and project on either side thereof to form lugs accommodating bolts 62, which are threaded into the lower contact plate 56 and fasten the latter and the upper contact plate 55 together as a rigid assembly. The upper and lower contact plates 55 and 56 are electrically insulated from each other by the provision of insulating bushings 63 (Figure 7) around each of the bolts 62, and by insulating washers 64 and 64ª, respectively located under the bolt heads, and between the parts so fastened together.

An integral projection 65 on one side of the lower contact plate 56 serves as a terminal for one end of a flexible electrical conductor 66 which is attached to it by means of a tapped stud 65ª. The flexible conductor 66 may be formed of laminated copper strips, and is fastened at its upper end to a terminal block 67 mounted on but insulated from the horizontal frame 44. The upper end of a similar flexible electrical conductor 68 is bolted to a terminal block 69 mounted on and electrically connected to the horizontal frame 44, and its lower end is fastened by a stud 70 to the upper contact plate 55. The terminal block 67 is connected by a cable 71 to one side of the secondary winding of a transformer 72 (Figure 9) and the other side is connected by a cable 73 to the terminal block 69. Current from the secondary side of the transformer 72 is therefore directed to the upper and lower contact plates 55 and 56 by means of the cable 73 and conductor 68, and by the cable 71 and conductor 66 respectively.

The upper contact plate 55 is provided with means for effecting a positive and distributed electrical contact with the surfaces 6ª and 9ª of the spur plate 1, when in its lowered position. For this purpose, a pair of downwardly extending projections 74 are integrally formed on each of the longitudinally webs 57. The projections 74 extend through cored openings 75 in the lower contact plate 56 and on their bottom faces support outwardly extending resilient contact arms 76, to which are fastened contact brushes 77. The contact brushes 77 are so located that they engage the faces 9ª of the spur plate 1 when the upper contact plate is in lowered position over it and provide, by reason of the resilient contact arms 76 and the wide area of contact, an electrical connection between the two elements that is positive and prevents arcing or other loss. Additionally, contact arms 78 are fastened to the lower surface of the contact plate 55 and support contact brushes 79 which are so disposed as to contact the flat upper surfaces 6ª of the spur plate 1 and still further reduce the current density between the two members when in contact.

The lower contact plate 56 is provided with a plurality of resiliently supported contacts 80 located to engage the head washer 14 of each of the spurs 10, when the contact assembly is in lowered position over the spur plate 1, and to provide a positive contact for the conduction of electrical current from the lower contact plate 56 to the spurs 10. Each of the contacts 80, as shown in Figure 6 consists of a U-shaped sheet metal clip 81 fastened to the lower surface of the lower contact plate 56 by a machine screw 82. A hole 83 in the lower side of the clip 81 loosely accommodates a contact button 84 which is provided with an enlarged head portion 85 serving as an abutment to limit the movement of the contact button through the hole 84. A compression spring 86 is disposed between the clip 81 and the upper side of the contact button 84 urging the latter downwards and providing a resilient contact against the head washer 14 of the spur 10, when the contact assembly 40 is lowered into engagement with the spur plate 10. A flexible copper conductor 87 is fastened to the upper side of the clip 81 by a rivet 88 and to the enlarged head 85 of the contact button 84 as by brazing or soldering to provide a positive conductor of electric current from the lower contact plate 56 to each of the contact buttons 84.

The apparatus for automatically controlling the operation of the pneumatic actuating cylinder 42, the heater circuit, and the movement of the spur plate 1 is diagrammatically shown in Figure 9. While the power source may be varied in voltage to suit existing conditions, I have found it convenient to provide a 110 volt control circuit and a 440 volt circuit, the latter providing the power for the heater transformer 72. While the output of the heating transformer 72 may be varied within the scope of this invention to suit the particular requirements of the apparatus, I have found that a secondary voltage of 4 volts and 80 amperes per spur provides a satisfactory temperature rise in the specific construction herein described. Each circuit is provided with a main cut-off switch, 89 for the control circuit and 90 for the heater circuit. The control apparatus consists essentially of a series of relays 91, 92, 93, 114, a magnetic switch 94 and a timing device 95 driven by an electric motor 96.

Actuation of the apparatus is effected by operation of the three switches 39, 97, and 98.

The switch 39 is operated by contact with the spur plate 1 as heretofore described. A triangular-shaped dog 101 is pivotally connected to the upper end of one of the rods 99 in such a manner as to contact and actuate the switch 97 when moved upwardly in response to movement of the contact carrier 40, and to tilt in order to prevent actuation of the switch 97 when rod 99 is moved downwards. One of the rods 100 carries a pinned arm 102 which actuates the switch 98 upon movement of the contact carrier 40.

Operation

Figure 9 represents the position of the control elements when the spur plate 1 has been moved to open the switch 39 and with the contact carrier 40 in the "up" position as shown dotted in Figure 4. The sequence of operations is then as follows:

(a) Actuation of the switch 39 by movement of the spur plate 1 opens its normally closed leg and closes its normally open leg. This releases the relay 91, opening the contacts 103 to stop motor 37, and simultaneously closes contacts 115 on the time-delay relay 114. Closing contacts 115 establishes a circuit to the holding contacts 104 on the relay 91.

(b) In the released position of relay 91, the contacts 105 are closed which in turn completes the circuit through the closed contacts 106 of the timing device 95 and energizes relay 92. The closing of contacts 107 opens electromagnetically actuated valves 48 and 51, and the opening of contacts 108 closes valves 49 and 50. This opens the upper chamber of the pneumatic cylinder 42 to pressure from the line 45, and discharges the lower chamber to the line 52, extending the piston rod 41 to lower the contact carrier 40 into engagement with the spur plate 1. This operation completes grounding contact between the upper contact plate 55 and the spur plate 1 through the surfaces 6ª and 9ª, and completes the circuit between the lower contact plate 56 and the spurs 10 through the contacts 80.

(c) When the contact carrier 40 has reached the bottom of its stroke, the arm 102 engages and closes switch 98 energizing relay 93, and closing the contacts 110 and 111. The closing of contacts 110 starts the timing motor 96, closing the holding cam 112 which is interlocked with the holding contacts 111 of relay 93. While holding cam 112 is held closed, subsequent rotation of timing motor 96 closes heater cam 113 which in turn closes the magnetic switch 94 through a pair of safety contacts 109 on the relay 92. The closing of the magnetic switch 94 completes the circuit between the 440 volt power source and the transformer 72 to impress electric energy on the spurs 10 through the flexible conductors 66 and 68 and the upper and lower contact plates 55 and 56.

The cam of the timing device 95 that actuates the contacts 113 is so proportioned as to maintain power to the spurs 10 for a sufficient length of time to cause separation of the frozen articles from them. While this time interval may, of course, be varied to suit the characteristics of the apparatus, I have found that sufficient heat to cause separation may be developed in the particular equipment herein described, in a time interval of approximately 1½ seconds. Because of the localization of the heat in the lower end of the spur and the use of that part of the spur itself as the resistance, the separation time is minimized and excessive heating with consequent burning or carmelization of any residual matter is eliminated.

(d) Further rotation of the timing device 95 opens contacts 106, de-energizing relay 92, and opens contacts 107 to close electromagnetic valves 48 and 51 and open valves 49 and 50. This operation directs pressure to the lower side of the pneumatic cylinder 42 and discharges the upper side, retracting the piston rod 41 and raising the contact carrier 40 from engagement with the spur plate 1.

(e) During retraction of the contact carrier 40, the dog 101 momentarily engages and actuates the switch 97 which energizes the relay 91. Relay 91 closes holding contacts 104 which maintains relay 91 closed through contacts 115 of relay 114. Contacts 103 are simultaneously closed starting motor 37 and ejecting the empty spur plate 1. During ejection, the roller-bearing operating arm 39ª is held in a depressed or closed position by spur plate 1, until cleared by the receding edge of the latter. The spring-loaded arm 39ª then returns to its normal position opening contacts 115 of relay 114 and reestablishing the circuit through the coil of relay 91, by-passing holding contacts 104. The assembly has then returned to the beginning of its operative cycle.

(f) During the operation of raising the contact carrier 40, the motor 96 of the timing device 95 returns to its starting position, at which point, the contact 112 is broken de-energizing the relay 93 and opening the circuit to the motor 96. At the same time, the contacts 106 are closed again, but cannot complete any circuit since it has been locked out by the open contacts 105 of relay 91.

An important distinction of the present apparatus resides in the arrangement of the spurs and the contact carrier in such a manner that the former are connected to the electrical supply in parallel. By reason of this arrangement, the failure of one of the spurs does not affect the operation of the others, which is not the case in systems wherein the spurs or their heating elements are arranged in series connection. The use of low-voltage power in the operation of the separating apparatus eliminates the hazard from shock and decreases short-circuiting attendant the use of the equipment, a feature that is particularly important since the apparatus is intended for general use in plants handling dairy products wherein humid working conditions are generally present.

As thus described, the invention comprehends a simplified and novel form of spur construction for supporting frozen confections during their manufacture wherein the spur comprises an outer electrically conductive housing connected at its lower end to a co-axial conductor, insulated from the inner surface of the housing, and connected to a contact supported and insulated from the upper end of the housing, the lower end of the housing being adapted to be immersed in the frozen confection and being reduced in section so as to create a rise of temperature between the frozen confection and the contacting portion of the housing when electrical energy is impressed across the housing and the contact. The novelty of the construction and the advantages flowing therefrom reside in the proportioning of the part of the housing that contacts the frozen confection in relation to that of the other elements of the spur in such a manner that the temperature rise resulting from the use of the spur in an electrical circuit is generated and localized within that portion of the housing itself by reason of its resistance relative to the other elements of the circuit. In addition, the invention provides novel apparatus for making simultaneous parallel contact between a plurality of spurs while supported in a spur plate, and a source of electrical power, and means for automatically controlling the apparatus and the application of power to the spurs.

It is to be understood that the foregoing description of the present invention is, in many respects, by way of example, and that there are many variations and modifications that may be employed without departing from the principles thereof. Other modifications in general arrangement and detail design which may occur to those skilled in the art, after reading the present specification, are intended to fall within the spirit and scope of this invention as more fully defined in the appended claims.

I claim:

1. A spur for supporting frozen articles during manufacture by having one end embedded therein comprising a unitary tubular shell adapted to operate as an electrical resistance having a continuous article-contacting surface and contact means associated with the free ends thereof adapted to be connected across a source of electrical energy to cause separation of a frozen article supported thereon by the temperature rise in said article-contacting surface resulting from heat generated in said electrical resistance.

2. A spur for supporting frozen articles during manufacture comprising a unitary tubular shell adapted to operate as an electrical resistance, and a coaxial insulated conductor within said tubular resistance connected to one end thereof, the free ends of said resistance and said conductor being adapted to be connected across a source of electrical energy to raise the temperature of said resistance by heat generated therein.

3. In a spur for supporting frozen articles during manufacture, an elongated electrical resistance having an article-contacting surface and being adapted to be connected across a source of electrical energy, a portion of said resistance adjacent one end being of reduced cross sectional area whereby the temperature rise in said reduced portion due to heat generated in said resistance is greater than the temperature rise in the unreduced portion thereof 4. An elongated electrical resistance for supporting frozen confections during their manufacture and adapted to cause separation thereof by temperature rise therein when connected across a source of electrical energy, comprising an electrically conductive housing, an electrically conductive head washer disposed at one end thereof and being insulated therefrom, and an insulated conductor connecting said head washer with the other end of said housing.

5. An electrically conductive spur for supporting frozen confections during their manufacture and adapted to cause separation thereof by temperature rise in said spur when connected across a source of electrical energy comprising a hollow tubular conductive housing flared at one end, a conductive head washer disposed at the flared end of said housing and separated therefrom by an insulating washer, a co-axial conductor within said housing electrically connected to the conducting washer and to the unflared end of said housing, and a co-axial insulator between said conductor and said housing.

6. An electrically conductive spur for supporting frozen confections during their manufacture and adapted to cause separation thereof by temperature rise in said spur when connected across a source of electrical energy comprising a hollow tubular conductive housing flared at one end and having a portion of its other end of reduced cross-sectional wall area, a conductive head washer disposed at the flared end of said housing and separated therefrom by an insulating washer, a co-axial conductor within said housing electrically connected to the conducting washer and to the unflared end of said housing, and a co-axial insulator between said conductor and said housing.

7. Apparatus for supporting frozen confections during their manufacture comprising a unitary electrically conductive plate having a hole to engage and form an electrical contact with one end of a depending elongated tubular spur, said spur being provided at its upper end with an electrically conductive head washer insulated from said plate and the end of the spur engaged in said hole, and being electrically connected to the other end of said spur.

8. In apparatus for supporting frozen articles and causing their separation therefrom including an elongated electrically heated spur having contact means adjacent one end and a spur plate supporting said spur, a movable carrier, an electrical contact operatively associated with said carrier, adapted to be connected to a source of electrical energy, actuating means operatively connected to said carrier and to said spur plate adapted to move said contact of said carrier into engagement with the contact of said spur; to connect said spur to said source of electrical energy.

9. In apparatus for supporting frozen articles and causing their separation therefrom including an elongated electrically heated spur having contact means adjacent one end and a spur plate supporting said spur, a movable carrier, an electrical contact operatively associated with said carrier adapted to be connected to a source of electrical energy, power actuable means operatively connected to said carrier and said spur plate adapted to move said contact of sair carrier into engagement with the contact of said spur; to connect said spur to said source of electrical energy.

10. In combination, an elongated electrical resistance for supporting frozen confections during manufacture, a member for supporting said resistance constituting an electrical conductor to one end thereof, a conductive washer operatively associated with said resistance and electrically connected to the other end thereof, a movable unitary contact carrier comprising a pair of contact elements connected to the sides of a source of electric energy and insulated from each other, and actuating means to move said contact carrier to engage one of the contact elements with the said support member and the other of the contact elements with the said conductive washer for the purpose of impressing an electric current across the resistance and causing separation of the confection therefrom.

11. In combination, an elongated electrical resistance for supporting frozen confections during manufacture, a member for supporting said resistance constituting an electrical conductor to one end thereof, a conductive washer operatively associated with said resistance and electrically connected to the other end thereof, a movable unitary contact carrier comprising a pair of contact elements connected to the sides of a source of electric energy and insulated from each other, actuating means to move said contact carrier to engage one of the contact elements with the said support member and the other of the contact elements with the said conductive washer for the purpose of impressing an electric current across the resistance and causing separation of the confection therefrom, and automatic means for controlling the duration of the electric current while the contact elements are in engagement with the conductive washer and the support member.

12. In combination, an elongated electrical resistance for supporting frozen confections during manufacture, a member for supporting said resistance constituting an electrical conductor to one end thereof, a conductive washer operatively associated with said resistance and electrically connected to the other end thereof, a movable unitary contact carrier comprising a pair of contact elements connected to the sides of a source of electric energy and insulated from each other, and actuating means to move the said contact carrier to engage one of the contact elements with the said support member and the other of the contact elements with the said conductive washer for the purpose of impressing an electric current across the resistance and causing separation of the confection therefrom, means for automatically controlling the actuating means, and automatic means for controlling the duration of the electric current impressed across the said resistance.

13. In apparatus of the type described, a structural frame, a movable unitary contact carrier connected to a source of electric energy, actuating means supported by said frame and operatively connected with said contact carrier, a member for supporting and positioning a spur plate adapted to be electrically heated within said frame, means for controlling the actuating means to engage the contact carrier with said spur plate when positioned within said frame and impress an electric current therein, and automatic means for controlling the flow of electric energy to said contact carrier.

14. In apparatus of the type described, a frame, a movable unitary contact carrier connected to a source of electric energy, an actuating cylinder supported by said frame and operatively connected with said contact carrier, a track for supporting and positioning a spur plate adapted to be electrically heated within said frame, electromagnetic means for controlling the operation of the actuating cylinder to engage the contact carrier with said spur plate, a magnetic switch for controlling the flow of electric energy to said contact carrier, and a timing device for controlling the sequence of operations of the actuating cylinder and the magnetic switch.

15. In apparatus of the type described, a frame, a movable unitary contact carrier connected to a source of electric energy, an actuating cylinder supported by said frame and operatively connected with said contact carrier, a track for supporting a spur plate within the frame, means for controlling the operation of the actuating cylinder to engage the contact carrier with said spur plate when positioned within said frame, motor driven means for positioning the said spur plate in relation to said contact carrier, and a motor driven timing device for controlling the sequence of operations of the actuating cylinder and the positioning means.

16. In apparatus of the type described, a frame, a movable unitary contact carrier connected to a source of electric energy, an actuating cylinder supported by said frame and operatively connected with said contact carrier, a track for supporting a spur plate within the frame, electromagnetic means for controlling the operation of the actuating cylinder to engage the contact carrier with said spur plate when positioned within said frame, motor driven means for positioning the said spur plate in relation to said contact carrier, a magnetic switch for controlling the flow of electric energy to contact carrier, and timing means for controlling the sequence of operations of the actuating cylinder, the positioning means, and the magnetic switch.

HAROLD GEORGE HUEBSCH.

References Cited in the file of this patent

UNITED STATES PATENTS

| Number | Name | Date |
| --- | --- | --- |
| 1,124,910 | Johnson et al. | Jan. 12, 1915 |
| 1,611,606 | Pope | Dec. 21, 1926 |
| 1,881,965 | Peterson | Oct. 11, 1932 |
| 1,893,513 | Balian | Jan. 10, 1933 |
| 2,109,822 | Eddy | Mar. 1, 1938 |